Figure 1:
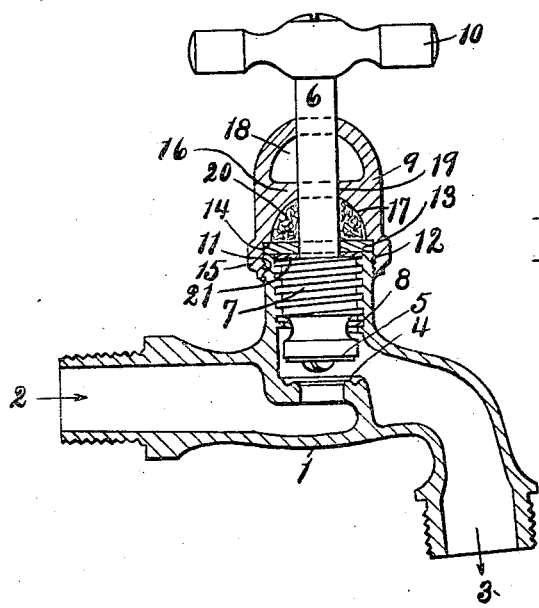

R. B. HILLS.
FAUCET.
APPLICATION FILED FEB. 19, 1918.

1,281,960.

Patented Oct. 15, 1918.

WITNESS:
A. C. Fairbanks.

INVENTOR.
Reuben B. Hills,
BY
Frank A. Cutter,
ATTORNEY.

UNITED STATES PATENT OFFICE.

REUBEN B. HILLS, OF NORTHAMPTON, MASSACHUSETTS, ASSIGNOR TO THE HAYDENVILLE COMPANY, OF HAYDENVILLE, MASSACHUSETTS, A CORPORATION OF NEW JERSEY.

FAUCET.

1,281,960.　　　　Specification of Letters Patent.　　Patented Oct. 15, 1918.

Application filed February 19, 1918.　Serial No. 218,046.

*To all whom it may concern:*

Be it known that I, REUBEN B. HILLS, a citizen of the United States of America, and a resident of Northampton, in the county of Hampshire and State of Massachusetts, have invented a new and useful Faucet, of which the following is a specification.

My invention relates to improvements in compression bibs or faucets, and resides in a certain peculiar cap mounted on the casing and encircling the valve-spindle, such cap having two chambers therein, one for the usual packing elements employed in compression bibs, and the other for some suitable lubricating matter or lubricant, all as hereinafter set forth.

One object of my invention is to provide a bib or faucet with a cover or cap for the interior valve parts, which cap thoroughly and completely protects said parts by preventing the entrance to the casing wherein said parts are located of dust, dirt, and other foreign matter or substance. Preferably the exterior or the major portion thereof of the aforesaid cap is smooth, wherefore the cap itself can be kept clean without difficulty.

Another object is to provide the cap in question with a receptacle or chamber in which to catch any grease or other lubricant that may ooze out of and up from packing members in a receptacle or chamber below said first-named receptacle or chamber, thus taking care of any excess or overflow that would otherwise escape around the valve-stem. In this connection it should be stated that the said upper receptacle affords means for catching any water that may be drawn up by capillary attraction on the valve-stem, which latter as will be understood extends through the cap, and returning such water to the place whence it came, thus preventing water, as well as grease or other lubricant from the packing members in the said lower chamber, from oozing out around said valve-stem on the outside of the faucet.

Still another object is to supply the said cap with lubricating matter or a lubricant that supplements the usual or ordinary packing members with which the cap is furnished, and augments the grease or other lubricant with which said members are originally supplied, to the end that such of said members as are capable of taking up said first-named lubricant are kept soft and pliable long after their original supply is exhausted or otherwise would be exhausted, and any metallic packing-ring or rings that may be used are kept covered or coated with said first-named lubricant. This extra supply of lubricant is placed in the upper receptacle or chamber to which reference has previously been made.

It appears, therefore, that this faucet is sanitary in all respects, in a sense is self-lubricating, its durability is increased, and withal it is highly practicable and efficient.

Although I prefer to supply the upper chamber in the cap with a lubricant, as previously stated, the lubricant may be omitted without impairing the serviceability of the same beyond the elimination of the extra supply of lubricant to the packing members in the chamber below.

Other objects and advantages will appear in the course of the following description.

I attain the objects and secure the advantages of my invention by the means illustrated in the accompanying drawings, in which—

Figure 2:
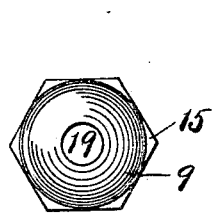
Figure 3:
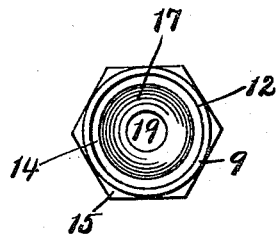

Figure 1 is a central, vertical section through a faucet which embodies a practical form of my invention; Fig. 2, a top plan of the cap, and, Fig. 3, a bottom plan of said cap.

Similar reference characters refer to similar parts throughout the several views.

I have illustrated and will describe my invention in connection with a compression bib of an ordinary type, but it is to be understood that said invention may be applied to or incorporated with any type or style of bib or faucet to which the same is applicable.

In the drawings are represented a casing 1 having an inlet at 2 and an outlet at 3, and provided with an intermediate horizontal valve-seat 4; a valve 5 for said valve-seat, said valve being secured at the inner end of a vertical valve-stem or spindle 6, and the latter having an externally screw-threaded part 7 which engages an internally screw-threaded part 8 of said casing; and a cap 9. A handle 10 is secured to the outer end of the spindle 6. The casing 1, with its inlet and outlet 2 and 3, respectively, valve-seat 4, and threaded part 8, is old, likewise the spindle 6 with its threaded part 7, and valve 5, and said valve is caused to open and close said valve-seat in the customary manner, that is, by turning said spindle up or down accordingly as to whether the faucet is to be opened or closed. In the first view the valve 5 is shown off of the valve-seat 4 and in wide-open position.

The casing 1 is externally screw-threaded at the upper end, as represented at 11, to receive the cap 9, which latter is internally screw-threaded at the lower end, as represented at 12, to engage said threaded part of said casing. A packing-ring 13, of leather or other suitable material, is located between the upper end of the casing 1 and an annular shoulder 14 within the cap 9 just above the threaded part 12, said cap being screwed down tightly onto said packing-ring. To facilitate putting on and taking off the cap 9 the same may have an exterior nut formation as represented at 15, at or adjacent to the lower end.

The cap 9 is divided by a horizontal partition 16 into under and upper chambers 17 and 18, respectively, the type of such chambers being dome-shaped, and each having a central opening 19 therein through and in which the spindle 6 extends and operates. Within the chamber 17, encircling and surrounding the spindle 6, are the packing-ring 13, a mass of packing material 20, and a metallic packing-ring or washer 21, together with the required amount of grease or other lubricant. Within the chamber 18 may be placed grease, oil, or other lubricant, different conditions under which the faucet is to be used necessitating different lubricating material or materials in said chamber.

The curved or dome-shaped tops of the chambers 17 and 18 are provided to facilitate the return of any moisture or excess lubricant that may be carried up by the spindle 6, since such moisture or lubricant can flow more freely down these concave surfaces than would be the case if the chambers were flat on top. This applies more particularly to the chamber 18, because said chamber contains no packing material, but in some degree also applies, furthermore, to provide the chamber 17 with a concave top, because such top has a tendency to compress the mass 20 around the spindle 6, when said spindle is actuated upwardly, and thus to prevent leakage through the opening 19, in the partition 16, around said spindle.

The packing material 20 is over and the washer 21 under the packing-ring 13. These packing members and the cap 9 are placed on the spindle 6 before the handle 10 is affixed to said spindle, and whatever lubricant is supplied to the chamber 18 must be introduced into said chamber through the opening 19 therein, which can be done while said cap is on said spindle and the former is held with its upper end above the corresponding end of the latter. The packing members, which are in place in the chamber 17 at this time, catch any lubricant that may be sufficiently fluidic to escape from the chamber 18, through the opening 19 in the partition 16 around the spindle 6, while said chamber 18 is being filled.

The spindle 6 has a sliding fit in the openings 19, in which it has a combined rotative and reciprocative action, consequently some of the lubricant with which the mass 20 is originally saturated or impregnated is very liable to be carried upward with said spindle, and even water may find or work its way upward past the threaded parts 7 and 8 and up the sides of said spindle, but in either of these events the lubricant or the water, or the lubricant and the water, are caught in the chamber 18, whether or not said chamber contains a supply of lubricant of its own, and prevented from working of its way up to escape around the top of the cap. The lubricant or water thus caught in the chamber 18 and not retained therein, finds its way down to the place from which it came. If the chamber 18 be supplied with lubricant, which by preference usually it should be, said chamber still serves as an ever ready trap for excess lubricant from the chamber below and for upwardly-escaping water, and in addition supplies any deficiency in lubricant that may exist in the chamber 17. The lubricant from the upper chamber works its way down through the opening 19 in the partition 16, or is carried by the spindle 6 down through said opening, to the mass 20 in the lower chamber.

The amount of lubrication afforded or for which provision is made, by the present construction, and the provision itself serve to reduce wear to the minimum, and prevent leakage of either lubricant or water. Furthermore, the faucet is dust-proof, easy to keep polished, and sanitary generally, by reason of its construction.

The washer 21 protects the packing-ring 13 from the impact of the threaded part 7 when the spindle 6 is rotated to open the valve 5 to its full extent.

The packing members or elements in the lower chamber 17, in and through which the spindle 6 operates, and the office of which is to make a tight joint between the casing 1 and the cap 9 and to prevent the water from ascending around said spindle above said elements, may be varied.

What I claim as my invention, and desire to secure by Letters Patent, is—

1. The combination, in a faucet, with the casing and valve-stem of the faucet, of a dome-shaped one-piece cap mounted on said casing around said valve-stem, and divided into two chambers by a horizontal partition, the chamber above said partition being adapted to contain a lubricant, and packing elements in the chamber below said partition.

2. The combination, in a faucet, with the casing and valve-stem of the faucet, of a dome-shaped one-piece cap mounted on said casing around said valve-stem, and divided by a horizontal partition into upper and lower semi-spherical chambers, said upper chamber being adapted to contain a lubricant, and packing elements in said lower chamber.

REUBEN B. HILLS.

Witnesses:
CATHRYN V. MOLLOY,
WILLIAM G. LOOMIS.